United States Patent
Chen

(10) Patent No.: US 12,201,214 B2
(45) Date of Patent: Jan. 21, 2025

(54) FRICTIONAL SLIDE RAIL WITH SYNCHRONOUS MIDDLE AND INNER RAILS AND LOCKABLE MIDDLE AND OUTER RAILS

(71) Applicant: MARTAS PRECISION SLIDE CO., LTD., New Taipei (TW)

(72) Inventor: Wan-Lai Chen, New Taipei (TW)

(73) Assignee: MARTAS PRECISION SLIDE CO., LTD., New Taipei (TW)

( * ) Notice: Subject to any disclaimer, the term of this patent is extended or adjusted under 35 U.S.C. 154(b) by 92 days.

(21) Appl. No.: 18/195,933

(22) Filed: May 10, 2023

(65) Prior Publication Data
US 2024/0374027 A1 Nov. 14, 2024

(51) Int. Cl.
*A47B 88/473* (2017.01)
*A47B 88/49* (2017.01)
*F16C 29/02* (2006.01)

(52) U.S. Cl.
CPC ............ *A47B 88/473* (2017.01); *A47B 88/49* (2017.01); *F16C 29/02* (2013.01)

(58) Field of Classification Search
CPC ....... A47B 88/473; A47B 88/49; A47B 88/57; A47B 2210/007; A47B 2210/0081; A47B 2210/0016; A47B 88/477; A47B 2210/0064; F16C 29/02
See application file for complete search history.

(56) References Cited

U.S. PATENT DOCUMENTS

| | | | | |
|---|---|---|---|---|
| 5,757,109 | A * | 5/1998 | Parvin | A47B 88/493 312/334.46 |
| 5,871,265 | A * | 2/1999 | Stewart | A47B 88/493 312/333 |
| 6,601,933 | B1 * | 8/2003 | Greenwald | A47B 88/49 312/334.46 |
| 6,860,575 | B2 * | 3/2005 | Chen | A47B 88/493 312/334.44 |
| 6,997,529 | B1 * | 2/2006 | Chen | A47B 88/493 312/334.47 |
| 6,997,611 | B2 * | 2/2006 | Chen | A47B 88/493 312/334.46 |
| 8,240,789 | B2 * | 8/2012 | Chen | A47B 88/493 312/334.7 |
| 9,538,845 | B1 * | 1/2017 | Chen | A47B 88/49 |
| 10,806,255 | B1 * | 10/2020 | Chen | A47B 88/443 |
| 10,813,454 | B1 * | 10/2020 | Chen | A47B 88/49 |

(Continued)

*Primary Examiner* — Hiwot E Tefera
(74) *Attorney, Agent, or Firm* — Fei-hung Yang

(57) ABSTRACT

A frictional slide rail with synchronous middle and inner rails and lockable middle and outer rails includes an inner rail, a middle rail, an outer rail and a synchronous locking spring plate. A first wing is formed on both sides of the inner rail, a second wing and a first slide groove are formed on both sides of the middle rail, and a second slide groove is formed on both sides of the outer rail. Inner rail is movably accommodated in middle rail, and middle rail is movably accommodated in outer rail to define a frictional sliding connection. Two second slide grooves have multiple micro top bumps for reducing the frictional area during sliding, synchronous locking spring plate is installed on middle rail and has an inner and middle rails locking part and a middle and outer rails locking part inwardly extended from an end of the synchronous locking spring plate.

7 Claims, 6 Drawing Sheets

(56) References Cited

U.S. PATENT DOCUMENTS

| | | | | |
|---|---|---|---|---|
| 11,246,410 B2* | 2/2022 | Chen | .................... | A47B 88/443 |
| 2002/0057042 A1* | 5/2002 | Milligan | ................ | A47B 88/49 |
| | | | | 312/334.46 |
| 2004/0207300 A1* | 10/2004 | Chen | .................... | A47B 88/493 |
| | | | | 312/334.44 |
| 2006/0029304 A1* | 2/2006 | Chen | .................... | A47B 88/493 |
| | | | | 384/18 |
| 2006/0284531 A1* | 12/2006 | Dubon | .................. | A47B 88/49 |
| | | | | 312/333 |
| 2007/0164644 A1* | 7/2007 | Hwang | ................. | A47B 88/49 |
| | | | | 312/333 |
| 2011/0135224 A1* | 6/2011 | Chen | ...................... | F16C 29/04 |
| | | | | 384/49 |
| 2016/0278521 A1* | 9/2016 | Chen | ...................... | A47B 88/42 |
| 2018/0338615 A1* | 11/2018 | Andersson | ............. | A47B 88/49 |
| 2021/0144878 A1* | 5/2021 | Wu | ........................ | A47B 88/49 |
| 2022/0240673 A1* | 8/2022 | Chen | ...................... | A47B 88/49 |

\* cited by examiner

FRICTIONAL SLIDE RAIL WITH SYNCHRONOUS MIDDLE AND INNER RAILS AND LOCKABLE MIDDLE AND OUTER RAILS

BACKGROUND

Technical Field

The present disclosure relates to the field of a furniture slide rails, and more particularly relates to a frictional slide rail with synchronous middle and inner rails and lockable middle and outer rails, which takes into account the sliding smoothness when the slide rail is pulled, and includes synchronization and locking functions in a thin design.

Description of Related Art

Desks, cabinets and other furniture are usually equipped with drawers to provide the anti-theft function and convenient storage, and the drawers are often pushed and pulled reciprocally for use. In order to improve the smoothness of use, it is common to install a pair of slide rails between the furniture and the drawer, so that the push or pull of the drawer becomes smoother and easier. Among these slide rails, the one with a three-stage design is popular for the reasons of convenient use and good space utilization, and this three-stage slide rail mainly includes an outer rail, a middle rail, an inner rail, and two slide assists. After the slide rails are installed to the furniture and drawers, the two slide assists such as ball bearings or rollers, etc. can be connected between the outer rail and the middle rail, and between the middle rail and the inner rail, so that the inner rail and the middle rail achieve a smooth sliding effect relative to the outer rail by means of the slide assists, and the drawer can be pushed or pulled smoothly to a great extent relative to the furniture, thereby saving much space after storage.

Compared to the furniture itself, drawers frequently involves a pulling reciprocal movement. In recent years, furniture requires good aesthetic appearance and texture and improves the smoothness of the drawers or door panels for operation, and a pair of slide rails is usually installed between a cabinet and the drawer to make the pulling or pushing of the drawer smoother. The slide rails of this sort used to assist sliding the drawers can be divided into two-stage slide rails and three-stage slide rails according to their expanding length, and the three-stage slide rails are most commonly used for the convenience of use. The three-stage slide rail mainly includes an outer rail, a middle rail, an inner rail and two sliding parts, the outer rail is usually fixed inside the cabinet, the inner rail is fixed to two opposite sides of the drawer, and the middle rail is connected between the outer rail and the middle rail and between the middle rail and the inner rail through by two sliding parts such as a ball bearing and a roller, etc., such that the inner rail and the middle rail can slide in and out smoothly along the same axial direction relative to the outer rail, and such design also can save space after storage.

However, the major shortcoming of this kind of three-stage slide rails with the slide assists is that they are too thick, and useless for some furniture with insufficient internal space. Therefore, there are also frictional slide rails with a thinner design on the market, which also come with the design of the inner rail, middle rail and outer rail, but the biggest difference is that no slide assists are used, so that the effect of thinning can be greatly improved, but the unsmooth sliding problem also arises. Due to the frictional resistance between the inner rail and the middle rail and between the middle rail and the outer rail, the rails can be fixed in any position without sliding farther after being pushed or pulled. In order to further improve the sliding smoothness of this kind of frictional slide rails, a variety of synchronous locking mechanisms are also designed in hope of enabling the inner rail to synchronously move with the middle rail until it is positioned at the limit of the stretching position before it is separated from the middle rail, and releasing the positioned state of the middle rail while the inner rail is retracted, so as to achieve the effect of synchronously retracting the middle rail with the inner rail. In addition, after the sliding rail is pushed in for the storage, the middle rail and the outer rail can also be locked. Therefore, most designs of the synchronous locking mechanism are complicated and have many parts. Due to the space limitation, the synchronous locking mechanism may sometimes be damaged and affect the smoothness of use of the drawer, and thus it is necessary to improve the conventional slide rails.

In view of the drawbacks of the prior art, the present disclosure conducted researches and experiments and finally developed a frictional slide rail with synchronous middle and inner rails and lockable middle and outer rail, which uses a plurality of micro top bumps in the outer rail to decrease the frictional area when the middle rail slides outward and make the sliding more smoothly. In addition, a synchronous locking spring plate of the present disclosure adopts the design of a spring plate, and the spring plate is mounted onto the middle rail and has an inner and middle rails locking part and a middle and outer rails locking part extended inwardly from an end, and the synchronous locking spring plate includes a pair of trigger parts, such that the thin frictional slide rail of the present disclosure has the synchronization and locking functions and will not affect its service life.

SUMMARY

Therefore, it is a primary objective of the present disclosure to provide a frictional slide rail with synchronous middle and inner rails and lockable middle and outer rails, and the frictional slide rail includes an inner rail, a middle rail, an outer rail and a synchronous locking spring plate. Two sides of the inner rail are formed with a first wing, both sides of the middle rail are formed with a second wing and a first slide groove, and both sides of the outer rail are formed with a second slide groove. The inner rail is movably accommodated in the middle rail, and the middle rail is movably accommodated in the outer rail. The two second slide grooves have a plurality of micro top bumps for reducing the frictional area during sliding to improve the smooth hand feel when use. In addition, the synchronous locking spring plate is installed on the middle rail and having an inner and middle rails locking part and a middle and outer rails locking part extended from an end of the synchronous locking spring plate, and the synchronous locking spring plate has a pair of trigger parts. With this structural design, the thin frictional slide rail has the synchronization and locking functions, which greatly improve the smooth hand feel and service life during use.

To achieve the aforementioned and other objectives, this disclosure discloses a frictional slide rail with synchronous middle and inner rails and lockable middle and outer rails, which includes: an inner rail, bent to form a first protrusion at the central part of the inner rail and a first wing; a middle rail formed on both sides of the inner rail separately and bent to form a second protrusion at the central part of the middle rail and a second wing and a first slide groove formed on both sides of the middle rail respectively, the two first wings of the inner rail are movably accommodated in the two first slide grooves, so that the inner rail forms a frictional sliding connection in the middle rail, and an outer rail is bent to form a second slide groove on both sides of the outer rail separately and provided to be movably accommodated in the two second wings of the middle rail, so that the middle rail forms a frictional sliding connection in the outer rail, and the two second slide grooves have a plurality of micro top bumps formed in the two second slide grooves and configured to be corresponsive to the two second wings respectively for reducing the frictional area during sliding; and a synchronous locking spring plate is a rectangular frame-structured elastic member formed by stamping a metal sheet, and an end of the synchronous locking spring plate is provided with a fixing part to be installed on the middle rail, and the other end is formed with an inwardly extended moving plate, the moving plate has an inner and middle rails locking part and a middle and outer rails locking part, and a pair of trigger parts are extended from an end of the synchronous locking spring plate opposite to the fixing part. In this way, when the inner rail is pulled outward, the inner and middle rails locking part will be used to lock with the inner rail to form a synchronization, and the middle rail will be pulled out together with the inner rail, and when the middle rail is pushed inward, the middle and outer rails locking part will be locked with the outer rail.

In an embodiment of the present disclosure, the two second wings are folded in half, so that the second wing is twice as thick as the material thickness. In addition, the middle rail has a positioning column configured to be corresponsive to the synchronous locking spring plate, and a pair of through holes formed on a side of the positioning column. After installation, the pair of trigger parts is disposed in the through holes to define a moving state, the inner and middle rails locking part is a notch disposed at the central part of the moving plate, and the inner rail has a convex part stamped on a surface of the inner rail, such that the convex part will be moved by the elasticity of the moving plate until it falls into the notch to define a locked state. On the contrary, when the convex part has not fallen into the notch, the convex part will maintain pressing the moving plate. The middle and outer rails locking part is a pair of hooks disposed at two side edges of an end of the moving plate, and the outer rail includes a pair of snap parts formed on the outer rail and configured to be corresponsive to the hooks respectively, and the convex part presses the moving plate to move the pair of hooks until the pair of snap parts is snapped to define a locked state. The pair of hooks forms a guide edge relative to the direction in which the middle rail is pushed in, and the guide edge is curved in a circular shape to provide guidance when the middle rail retracts. In addition, the pair of trigger parts is pressed when the inner rail is pulled outward to link the pair of middle and outer rails locking parts to separate from the pair of snap parts, so as to define a release state.

In another embodiment, the frictional slide rail with synchronous middle and inner rails and lockable middle and outer rails of the present disclosure further includes a plurality of micro bumps formed at two side edges of the inner rail, such that after the inner rail is movably accommodated in the first slide groove, the micro bumps will be used to reduce the frictional area during sliding.

DESCRIPTION OF THE EMBODIMENTS

This disclosure will now be described in more detail with reference to the accompanying drawings that show various embodiments of this disclosure.

Figure 1:
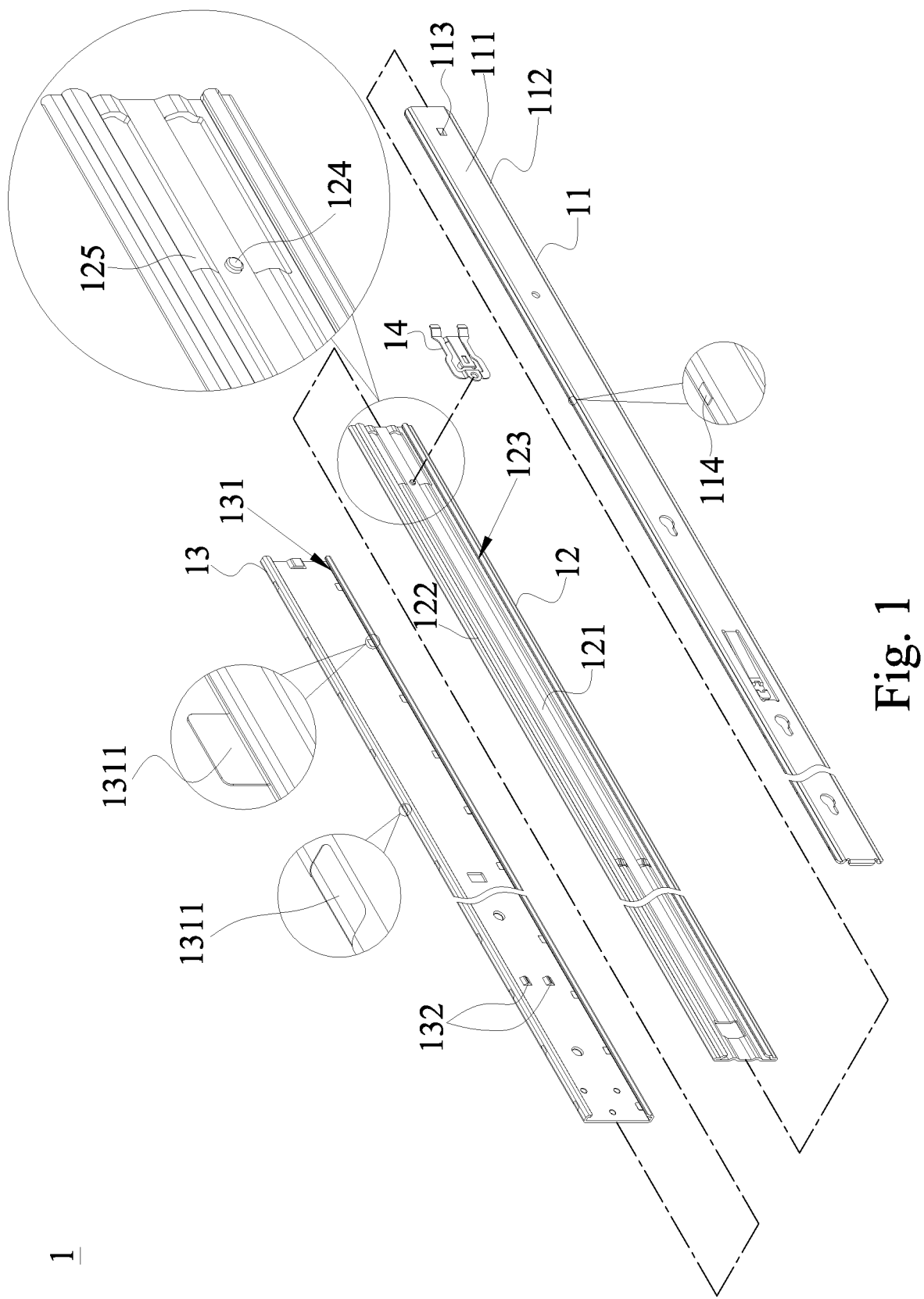
FIG. 1 is a perspective view showing the structure of a preferred embodiment of this disclosure.
Figure 2:
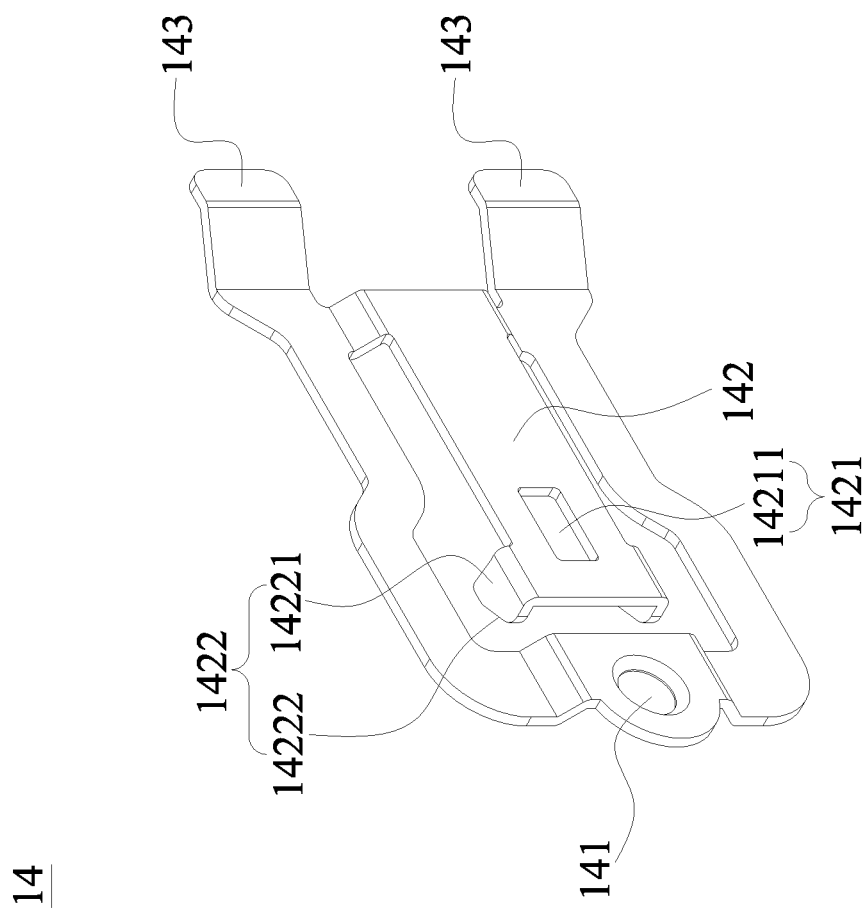
FIG. 2 is a perspective view showing the structure of a synchronous locking spring plate in accordance with a preferred embodiment of this disclosure.
Figure 3:
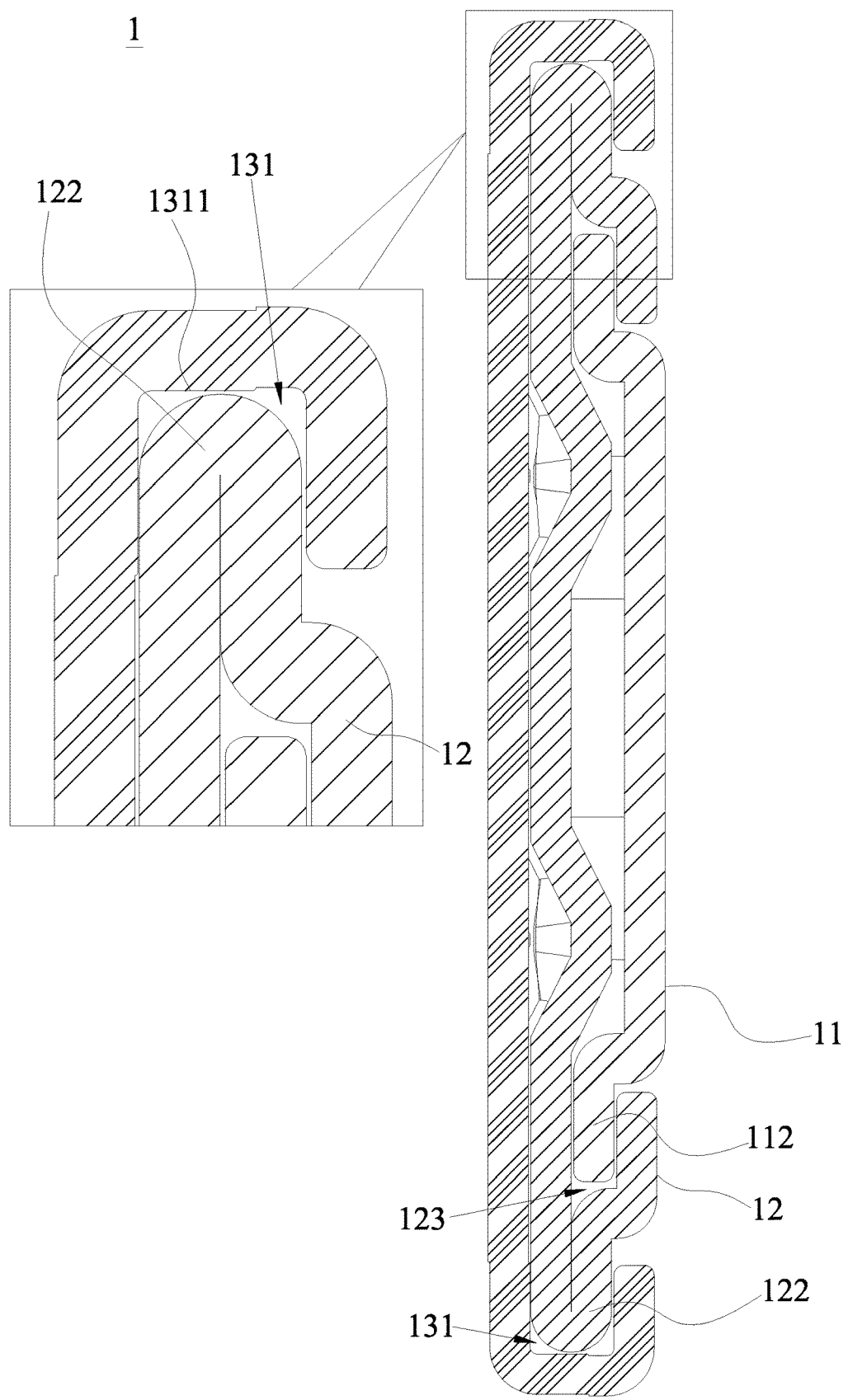
FIG. 3 is a cross-sectional view showing the assembled structure of a preferred embodiment of this disclosure.
Figure 4:
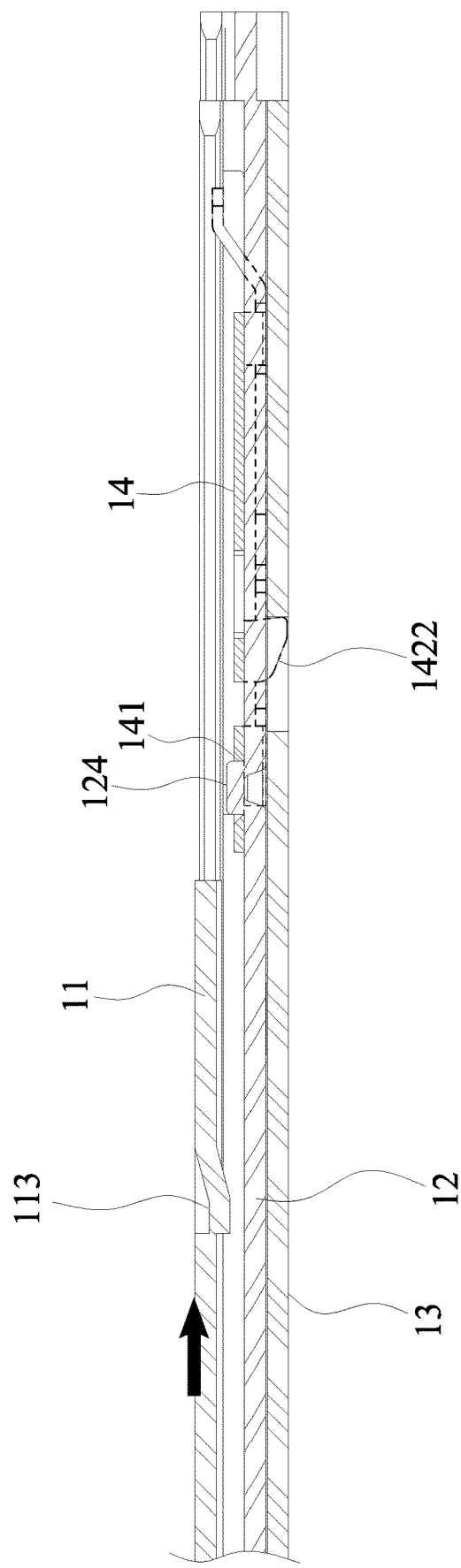
FIG. 4 is a first schematic view showing an operating state of a preferred embodiment of the present disclosure.
Figure 5:
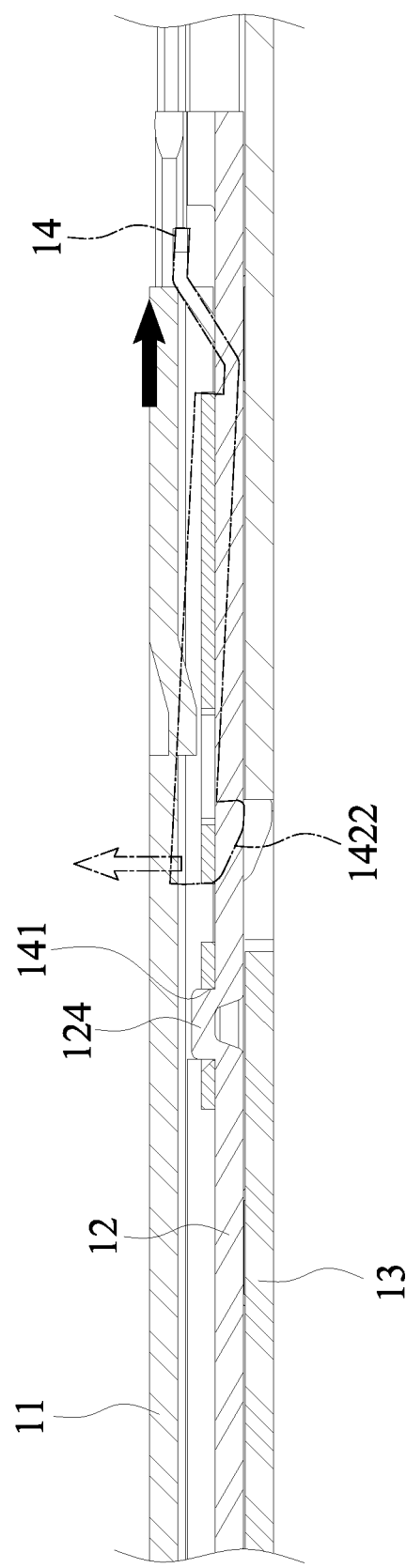
FIG. 5 is a second schematic view showing an operating state of a preferred embodiment of the present disclosure.
Figure 6:
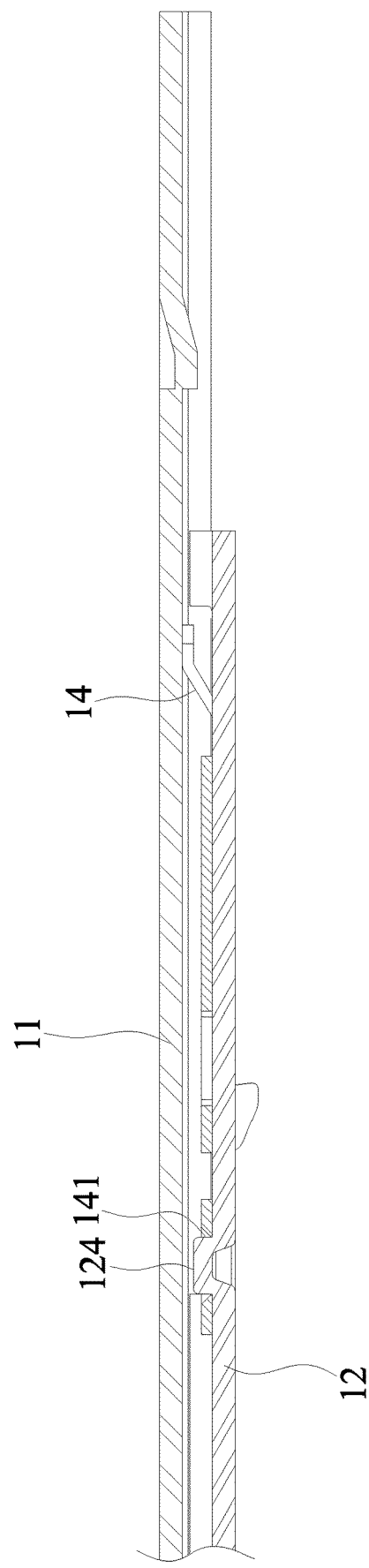
FIG. 6 is a third schematic view showing an operating state of a preferred embodiment of the present disclosure.

With reference to FIGS. 1, 2, 3, and 4 to 6 for a perspective view of the structure of a preferred embodiment of the present disclosure, a perspective view of the structure of a synchronous locking spring plate of a preferred embodiment of the present disclosure, a cross-sectional view of the assembled structure of a preferred embodiment and three schematic views of the operating states of a preferred embodiment of the present disclosure respectively, a frictional slide rail with synchronous middle and inner rails and lockable middle and outer rails 1 of the present disclosure includes an inner rail 11, a middle rail 12, an outer rail 13 and a synchronous locking spring plate 14.

Wherein, the inner rail 11 is bent to form a first protrusion 111 at the central part of the inner rail 11, and both sides of the inner rail 11 are formed with a first wing 112 separately.

The middle rail 12 is formed to form a second protrusion 121 at the central part of the middle rail 12, and both sides of the middle rail 12 are formed with a second wing 122 and a first slide groove 123 respectively. The two first wings 122 of the inner rail 11 are movably accommodated in the two first slide grooves 123, such that the inner rail 11 forms a frictional sliding connection in the middle rail 12, and the two second wings 122 are folded in half, so that the second wing is twice as thick as the material thickness.

The outer rail 13 is bent to form a second slide groove 131 on both sides of the outer rail 13 separately and provided for movably accommodating the two second wings 122 of the middle rail 12 respectively, so that the middle rail 12 forms a frictional sliding connection in the outer rail 13. In addition, the two second slide grooves 131 have a plurality of micro top bumps 1311 formed in the two second slide grooves 131 and configured to be corresponsive to the two second wings 122 respectively and provided for reducing the frictional area during sliding.

The synchronous locking spring plate 14 is a rectangular frame-structured elastic member formed by stamping a metal sheet, an end of the synchronous locking spring plate 14 is provided with a fixing part 141 and installed on the middle rail 12, the other end of the synchronous locking spring plate 14 is provided with a moving plate 142, the moving plate 142 has an inner and middle rails locking part 1421 and a middle and outer rails locking part 1422, and a pair of trigger parts 143 are extended from an end of the synchronous locking spring plate 14 opposite to the fixing part 141. It is noteworthy that the inner and middle rails locking part 1421 is a notch 14211 disposed at the central part of the moving plate 142, and a convex part 113 is stamped on a surface of the inner rail 11, such that after the convex part 113 is moved by the elasticity of the moving plate 142 until the convex part 113 falls into the notch 14211, a locked status is defined. On the contrary, if the convex part 113 has not fallen into the notch 14211, the convex part 113 will maintain pressing the moving plate 142. In addition, the middle and outer rails locking part 1422 is a pair of hooks 14221 disposed at two side edges at an end of the moving plate 142, and the outer rail 13 has a pair of snap parts 132 disposed on the outer rail 13 and configured to be corresponsive to the hooks 14221 respectively. After the convex part 113 presses the moving plate 142 to move the pair of hooks 14221 until the pair of snap parts 132 is snapped, a locked state is defined. In addition, the pair of hooks 14221 is pushed in a direction relative to the middle rail 12 to form a curved guide edge 14222 substantially in a circular shape, and the curved guide edge 14222 is provided for the guidance for retracting the middle rail 12. In addition, the pair of trigger parts 143 is pressed when the inner rail 11 is pulled outward, so as to link the pair of middle and outer rails locking parts 1422 to separate from the pair of snap parts 132 to define a release state. The middle rail 12 has a positioning column 124 configured to be corresponsive to the synchronous locking spring plate 14, and a pair of through holes 125 formed on a side of the positioning column 124. The pair of trigger parts 143 after installation is disposed in the through holes 125 to define a moving state.

In addition, the frictional slide rail with synchronous middle and inner rails and lockable middle and outer rails 1 of, the present disclosure further includes a plurality of micro bumps 114 formed on two side edges of the inner rail 11, such that after the inner rail 11 is movably accommodated in the first slide groove, the micro bumps 114 will reduce the frictional area during sliding to make the linear movement of the inner rail 11 more smoothly.

In summation of the above description of the frictional slide rail with synchronous middle and inner rails and lockable middle and outer rails 1 of the present disclosure, when the inner rail 11 is pulled outward, the inner and middle rails locking part 1421 and the inner rail 11 are engaged with each other to define a synchronization, such that the middle rail 12 will be pulled outward with the inner rail 11 altogether, and when the middle rail 11 is pushed inward, the middle and outer rails locking part 1422 will be locked with the outer rail 13 to achieve the effect of improving the smooth hand feel when use and the service life.

What is claimed is:

1. A frictional slide rail with synchronous middle and inner rails and lockable middle and outer rails, comprising:
    an inner rail, bent to form a first protrusion at central part thereof, and having a first wing formed on both sides of the inner rail;
    a middle rail, bent to form a second protrusion at central part thereof, and having a second wing and a first slide groove formed on both sides of the middle rail respectively, and provided for movably accommodating the first wings of the inner rail in the first slide grooves respectively, such that the inner rail forms a frictional sliding connection in the middle rail;
    an outer rail, bent to form a second slide groove on both sides thereof, and provided for movably accommodating the second wings of the middle rail, such that the middle rail forms a frictional sliding connection in the outer rail, and the second slide grooves comprise a plurality of micro top bumps formed therein and configured to be corresponsive to the second wings, for reducing frictional area during sliding; and
    a synchronous locking spring plate, which is a rectangular frame-structured elastic member formed by stamping a metal sheet, and an end of the synchronous locking spring plate having a fixing part to be installed on the middle rail, and another end of the synchronous locking spring plate having a moving plate with an inner and middle rails locking part and a middle and outer rails locking part disposed on the moving plate, and a pair of trigger parts are extended from an end of the synchronous locking spring plate opposite to the fixing part; such that when the inner rail is pulled outward, the inner and middle rails locking part and the inner rail are engaged with each other to define a synchronization, and the middle rail is pulled outward with the inner rail, and when the middle rail is pushed inward, the middle and outer rails locking part and the outer rail are locked, wherein
    the middle rail comprises a positioning column corresponding to the synchronous locking spring plate, and a pair of through holes formed on a side of the positioning column, and the pair of trigger parts after installation are disposed in the pair of through holes to define a moving state.

2. The frictional slide rail with synchronous middle and inner rails and lockable middle and outer rails according to claim 1, wherein the second wings are folded in half, such that each of the second wing is twice as thick as a material thickness.

3. The frictional slide rail with synchronous middle and inner rails and lockable middle and outer rails according to claim 1, wherein the inner and middle rails locking part is a notch disposed at central part of the moving plate, and a convex part is stamped on a surface of the inner rail, such that a locked state is defined after the convex part is moved by elasticity of the moving plate until the convex part falls into the notch, on the contrary, if the convex part has not fallen into the notch, the convex part will remain pressing the moving plate.

4. The frictional slide rail with synchronous middle and inner rails and lockable middle and outer rails according to claim 3, wherein the middle and outer rails locking part is a pair of hooks disposed at two side edges of an end of the moving plate, and the outer rail comprises a pair of snap parts formed thereon and configured to be corresponsive to the pair of hooks respectively, and the convex part presses the moving plate to move the pair of hooks until the pair of snap parts is snapped to define a locked state.

5. The frictional slide rail with synchronous middle and inner rails and lockable middle and outer rails according to claim 4, wherein the pair of hooks forms a guide edge relative to a direction in which the middle rail is pushed in, and the guide edge is curved in a circular shape to provide guidance when the middle rail retracts.

6. The frictional slide rail with synchronous middle and inner rails and lockable middle and outer rails according to claim 5, wherein the pair of trigger parts is pressed when the inner rail is pulled outward to link the middle and outer rails locking part to separate from the pair of snap parts, so as to define a release state.

7. The frictional slide rail with synchronous middle and inner rails and lockable middle and outer rails according to claim 1, further comprising a plurality of micro bumps disposed on two side edges of the inner rail, such after the inner rail is movably accommodated in the first slide groove, the micro bumps reduce frictional area during sliding.

* * * * *